Aug. 27, 1935.  F. K. TAYLOR  2,012,736
RECORDER
Filed Aug. 1, 1933
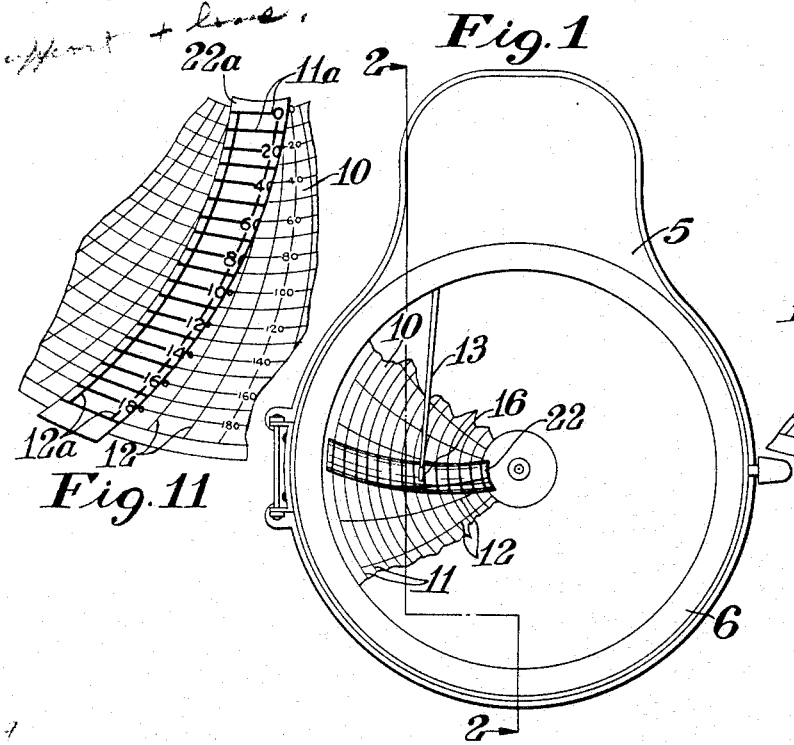
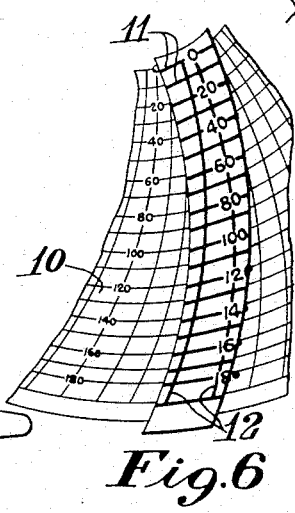
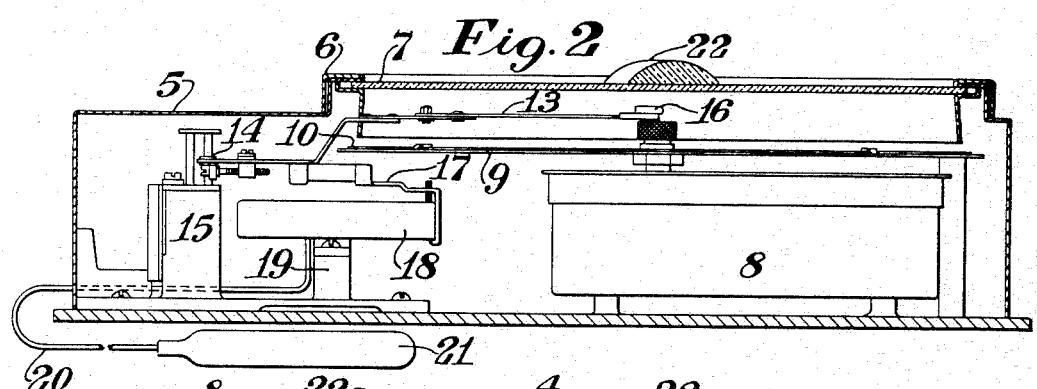
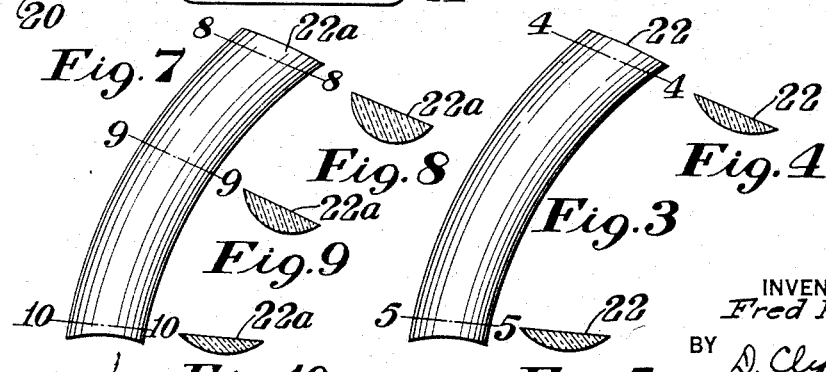
INVENTOR
Fred K. Taylor
BY D. Clyde Jones
ATTORNEY Patented Aug. 27, 1935

2,012,736

UNITED STATES PATENT OFFICE 2,012,736

RECORDER

Fred K. Taylor, Rochester, N. Y., assignor to Taylor Instrument Companies, Rochester, N. Y., a corporation of New York Application August 1, 1933, Serial No. 683,182

3 Claims. (Cl. 88—39)

This invention relates to recorders and/or indicators.

In indicating and recording devices having time-driven charts, the intersecting lines which graduate these charts according to time and the condition to be indicated or recorded, are necessarily placed so closely together that it is difficult at any appreciable distance from the chart to read the record drawn thereon. Furthermore, in the case of circular charts where the time intervals are indicated by a series of arcs which extend toward the center of the chart, the spacing of these arcs at the inner margin of the chart is so restricted that the reading of the chart is rendered confusing.

In accordance with the present invention a lens element is superimposed over the possible path of movement of the instrument indicator or stylus, as the case may be, in such relation to the chart that the portion thereof under this path is greatly magnified.

A further feature of the invention relates to a lens element of such contour that the radiating time lines of the chart in the field of the lens appear to be parallel when viewed therethrough.

For a clearer understanding of the invention, reference is made to the drawing in which Fig. 1 is a front elevation of an indicator or recorder of the present invention; Fig. 2 is a sectional view taken substantially on the line 2—2 of Fig. 1; Fig. 3 is a front view of a lens suitable for use in the recorder of Figs. 1 and 2; Figs. 4 and 5 are cross-sectional views of this lens taken on the corresponding section lines of Fig. 3; Fig. 6 is an enlarged view of a portion of the chart of Fig. 1 with the lens in superimposed relation thereto, to show the magnified appearance of the lines thereon; Fig. 7 illustrates a modified form of lens; while Figs. 8, 9 and 10 represent cross-sectional views thereof taken on the section lines indicated by the corresponding numbers; and Fig. 11 is an enlarged view of a portion of a chart with the modified form of the lens in superimposed relation thereto, to indicate the appearance of the lines on the chart when magnified by this lens.

In Fig. 1, 5 designates the case of an indicator or recorder of the conventional type and 6 a hinged door therefor, carrying the usual protecting glass 7. Within the case there is provided a suitable clock 8 which rotates a chart support 9 in the well-known manner in accordance with the passage of time. The chart support carries a chart 10 having printed thereon a series of concentric lines 11 spaced according to temperature, pressure or other similar condition to be indicated or recorded. This chart is also provided with a series of uniformly spaced curved lines 12 radiating from the inner margin of the chart and intersecting the concentric lines, which curved lines represent time intervals. A pen arm 13, which is pivoted at 14 on a bracket 15 supported at the back of the case, terminates in a pen or stylus 16. This pen arm is connected by a link (not shown) to a bracket 17 attached to the free end of a Bourdon spring 18 which has its fixed end mounted on a bracket 19 carried on the rear wall of the case. It will be understood that the fixed end of the Bourdon spring communicates through a capillary tube 20 with a condition-responsive bulb 21, to constitute a tube system which is filled with an actuating fluid.

The instrument just described is typical of any one of several different types of measuring instruments in which the present invention may be incorporated. The invention itself comprises the application to an instrument of a lens element 22 in such a position that the scale lines on that portion of the chart 10, which are in the path of movement of the stylus 16, are magnified. As herein illustrated the lens 22 is fastened adhesively to the outside surface of the glass 7 in the instrument door, by means of a suitable adhesive such as Canada balsam or any other suitable optical cement.

The lens 22, which is shown in Figs. 3 to 5 inclusive, is a cylindrical lens having a uniform radius of curvature and is slightly curved about its main axis to conform to the curvature of the possible path of movement of the stylus 16. In the present arrangement it is preferred that the lens 22 have its focus in a plane at the rear of the chart 10, as shown in Fig. 2. The use of the lens 22 in the position shown effects magnification of the graduations including the lines and the designating members on a strip of the chart as illustrated in Fig. 6.

In the modified form of the invention, as shown in Figs. 7, 8, 9, 10 and 11, the lens 22 is replaced by a lens 22a which is mounted in a position identical with that of the lens 22. In the case of the lens 22a it has a progressively decreasing radius of curvature from the outer to the inner margin of the chart, as shown in Fig. 1. By this formation of the lens the converging lines 12 on the chart appear to be parallel lines, such as 12a on that portion of the chart in the field of the lens.

The present disclosure is given by way of example, since there may be numerous variations and modifications thereof within the scope of the appended claims without departing from the spirit of the invention.

I claim:

1. In combination with a measuring instrument having a graduated scale member in which certain of the graduations thereon are uniformly spaced radiating curved lines and an element movable parallel to said member and parallel to one of said radiating curved lines, of a longitudinally curved lens mounted parallel to and adjacent to said member, said lens having a gradually changing radius of curvature proportional to the distance between each adjacent pair of radiating lines whereby a pair of radiating lines in the field of said lens appear to be substantially parallel.

2. The combination with a measuring instrument having a graduated scale member, said member being provided with a series of concentric graduations and with uniformly spaced radiating curved lines, an element movable parallel to said member and transversely to the graduations thereon, of a lens longitudinally curved to conform with certain of said curved lines and having a gradual changing radius of curvature, said lens being mounted adjacent to said element and parallel to its line of movement.

3. The combination with a measuring instrument having a circular graduated scale member, said member being provided with a series of concentric graduations and with uniformly spaced radiating curved lines, an element movable parallel to said member and transversely to the graduations thereon, of a lens longitudinally curved to conform with certain of said curved lines and having a gradual decreasing radius of curvature from the margin of said member to the inner portion thereof, said lens being mounted adjacent to said element and parallel to its line of movement.

FRED K. TAYLOR.